United States Patent
Kwon

(10) Patent No.: US 6,223,020 B1
(45) Date of Patent: Apr. 24, 2001

(54) DESTINATION NON-LIMITING BIDIRECTIONAL RADIO PAGING SYSTEM AND METHOD

(75) Inventor: Tae-Youn Kwon, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 08/885,528

(22) Filed: Jun. 30, 1997

(30) Foreign Application Priority Data

Jun. 29, 1996 (KR) .................................................. 96/26443

(51) Int. Cl.⁷ ...................................................... H04Q 7/20
(52) U.S. Cl. .................... 455/31.3; 455/556; 340/825.44
(58) Field of Search .................. 455/31.1, 31.2, 455/31.3, 32.1, 38.1, 515, 520, 526, 417, 434, 458, 459, 466, 38.2, 38.5, 550, 552, 553, 556, 557, 418; 340/825.44, 825.22, 825.47

(56) References Cited

U.S. PATENT DOCUMENTS

| | | | |
|---|---|---|---|
| 5,117,449 | * 5/1992 | Metroka et al. | 455/31.2 |
| 5,481,590 | * 1/1996 | Grimes | 455/417 |
| 5,559,860 | * 9/1996 | Mizikovsky | 455/31.2 |
| 5,574,771 | * 11/1996 | Driessen et al. | 455/31.3 |
| 5,631,635 | * 5/1997 | Robertson et al. | 455/825.47 |
| 5,697,060 | * 12/1997 | Akahane | 455/38.1 |
| 5,721,733 | * 2/1998 | Wang et al. | 455/466 |
| 5,737,690 | * 4/1998 | Gutman | 455/38.1 |
| 5,799,012 | * 8/1998 | Ayerst et al. | 455/31.3 |
| 5,809,415 | * 9/1998 | Rossmann | 455/31.3 |
| 5,818,833 | * 10/1998 | Maruyama | 455/553 |
| 5,850,186 | * 12/1998 | Min | 340/825.44 |
| 5,854,984 | * 12/1998 | Buhrmann et al. | 455/31.3 |
| 5,857,156 | * 1/1999 | Anderson | 455/38.1 |
| 5,914,669 | * 6/1999 | Wicks et al. | 340/825.44 |
| 5,920,271 | * 12/1999 | Hwang | 340/825.44 |

* cited by examiner

*Primary Examiner*—Dwayne Bost
*Assistant Examiner*—Jean A Gelin
(74) *Attorney, Agent, or Firm*—Dilworth & Barrese, LLP

(57) ABSTRACT

The present invention relates to bidirectional radio paging systems and methods of paging without limiting destinations wherein at least one bidirectional radio pager and an uplink control device share a database containing information on a plurality of paging destinations and about response messages of various contents, and wherein a specified uplink data format is used for communication between base station equipment and the bidirectional radio pager, whereby the bidirectional radio pager comprises a first data generator for transforming destination information not previously registered in the database to a data format substantially in conformity with a data format associated with the uplink control device and a second data generator for generating radio transmission data containing a free destination flag as a message type, data related to the formatted unregistered destination information provided by the first data generator, and an index indicating an optional message content selected from the database.

13 Claims, 5 Drawing Sheets

DESTINATION NON-LIMITING BIDIRECTIONAL RADIO PAGING SYSTEM AND METHOD

BACKGROUND OF THE INVENTION

1. Field of the Invention

The present invention relates to systems and methods for controlling receipt of a calling signal in a bidirectional radio paging system, and more particularly to systems and methods which provide destination non-limiting bidirectional radio paging operation.

2. Description of the Related Art

In the conventional bidirectional (calling/receiving) radio paging system, the bidirectional radio paging device (hereinafter referred to as "bidirectional radio pager") has a database for storing limited information on paging parties and various types of response messages for responding to optional paging signals. The above response messages are to be received by paging (calling) parties, and the above paging parties' information is the information as seen by paged (receiving) parties upon issuing a locate command.

The base station equipment of the bidirectional radio paging system shares the above database with the above bidirectional radio pager. Accordingly, the above paging party's information and the selected response message are not directly transmitted and received, but only corresponding indexes are exchanged.

However, it is not only inefficient in terms of utilization of the bidirectional radio pager but also inconvenient for users that the bidirectional radio pager can respond only to limited paging parties since the base station and the bidirectional radio pager share the above database. In other words, as compared to the diversity of paging parties, the information on paging parties to which the paged party can respond is limited, so that the users must take measures for making a response separately.

SUMMARY OF THE INVENTION

It is an object of the present invention to provide a bidirectional radio paging system and method capable of paging without limiting destinations, whereby the paged party can freely select and respond to the paging party without limiting the scope of the paging parties available for response.

In one aspect of the present invention, in a bidirectional radio paging system having at least one paging device and an uplink control device in which the at least one paging device and the uplink control device share a database containing information on a plurality of paging destinations and about response messages of various contents, the at least one paging device comprises: a first data generator for transforming destination information not previously registered in the database to a data format substantially in conformity with a data format associated with the uplink control device; and a second data generator for generating radio transmission data containing a free destination flag as a message type, data related to the formatted unregistered destination information provided by the first data generator, and an index indicating an optional message content selected from the database.

These and other objects, features and advantages of the present invention will become apparent from the following detailed description of illustrative embodiments thereof, which is to be read in connection with the accompanying drawings, in which like reference symbols indicate the same or similar components.

DETAILED DESCRIPTION OF PREFERRED EMBODIMENTS

Figure 1:
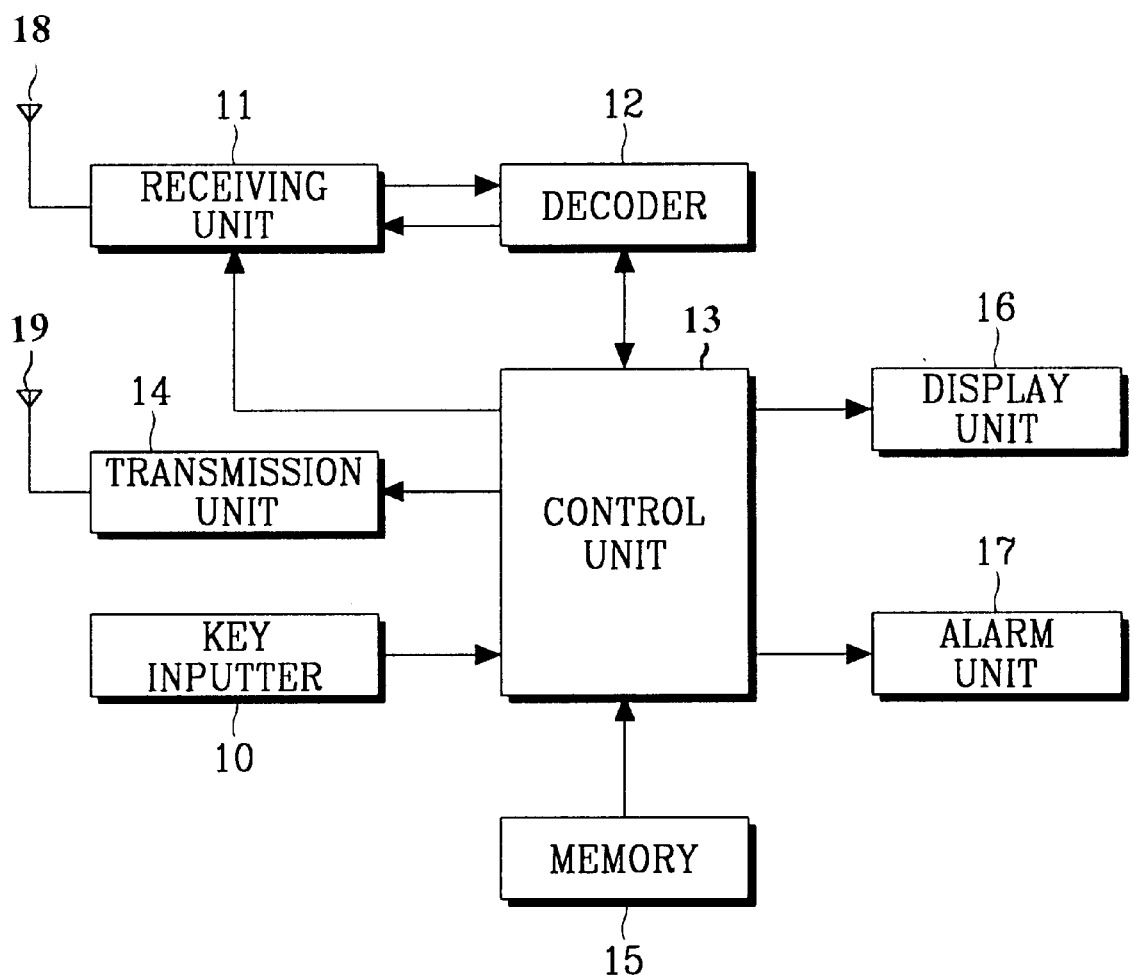
FIG. 1 is a block diagram illustrating a bidirectional radio paging device according to the present invention.

Referring to FIG. 1, a block diagram illustrating a bidirectional radio paging device according to the present invention is shown. Particularly, a control unit 13 is operatively coupled to a key inputter 10, a receiving unit 11, a decoder 12, a transmission unit 14, a memory unit 15, a display unit 16 and an alarm unit 17. The receiving unit 11 is also operatively coupled to an antenna 18 and the decoder 12. The transmission unit 14 is also operatively coupled to an antenna 19.

The key inputter 10 comprises keys for inputting user's paging information, and generating various control signals for operation of the bidirectional radio pager, for example, keys like a power on/off key, a channel scanning key for periodically performing scanning operation during channel scanning mode, and a read key for displaying messages received.

The receiving unit 11 amplifies weak RF signals of an assigned channel received from paging terminal equipment through the antenna 18, converts the amplified signals into an original signal frequency band so as to be demodulated, and subjects the demodulated signals to waveform-shaping such that the signals are modified into digital data.

The decoder 12 decodes the digital data received from the RF receiving unit 11 to further transmit. In other words, the decoder 12 decodes the coded data received (usually data in BCH code) to original data, and detects preamble data, wordsync and its own frame data from the data in the form of POCSAG code for further transmitting.

The memory unit 15 is a memory for storing information on the bidirectional radio pager itself in which one or more EEPROM devices may preferably be employed. The information stored in the memory 15 includes cap codes consisting of inherent address data and frame data containing area information, reference channel frequencies for setting area channels, and service channel frequencies for receiving radio paging service in the area set by the above reference channel frequencies. Further, the above memory 15 stores a database which contains information on a limited number of optional paging parties intended for response (information about paging parties receiving response message from paged parties) and various types of response messages.

The control unit 13 analyzes information in the memory 15 to control the paging function of the bidirectional radio pager, thereby first performing the channel scanning function for initial operation when receiving the power on signal from the key inputter 10. Namely, the above control unit 13 includes a first data generator for transforming free destination information (i.e., unrestricted or unlimited destination information which is not registered, that is, destination information not previously stored in the above database) into a pure data format conforming with the above uplink data format. The control unit 13 also includes a second data generator for generating radio transmission data containing the a free destination flag as a message type, data related to the above free destination information produced by first data generator, and an index indicating an optional message content selected from the above database.

The control unit 13 consecutively selects the reference channel frequencies retrieved from the above memory 15 and outputs the selected reference channel frequencies in specified periods so as to assign channels, thereby checking the presence of data from the assigned channel.

Thereupon, if data is received, the control unit 13 analyzes area information contained in the cap code to determine the area in which the bidirectional radio pager is currently located, and then outputs the service channel frequency corresponding to the area so as to analyze the frame data received from the assigned service channel, thereby controlling the overall function of the bidirectional radio pager.

The transmission unit 14 assigns the channel and transmitted data depending upon destination and selected messages from the above control unit 13.

The display unit 16 displays various types of status and messages generated and received during radio paging services under the control of the control unit 13. For example, the display unit 16 may be an LCD panel. The alarm unit 17 generates an alarm signal when receiving messages under the control of the control unit 13. The above alarm unit 17 comprises an alarm sounding device and a vibrator for generating a vibration signal.

When power is first turned on, or when the bidirectional radio pager is moved to another area, the bidirectional radio pager must be able to analyze its regional location and assign the service channel frequency corresponding to the area. For convenience sake, the above state is called the initial operating state which is assumed to be initiated by turning the power switch on. When the initial operating state is initiated, the above control unit 13 reads the information in the memory 15 storing the cap code of the receiver, the reference channel frequency and the service channel frequency, etc.

Figure 2:
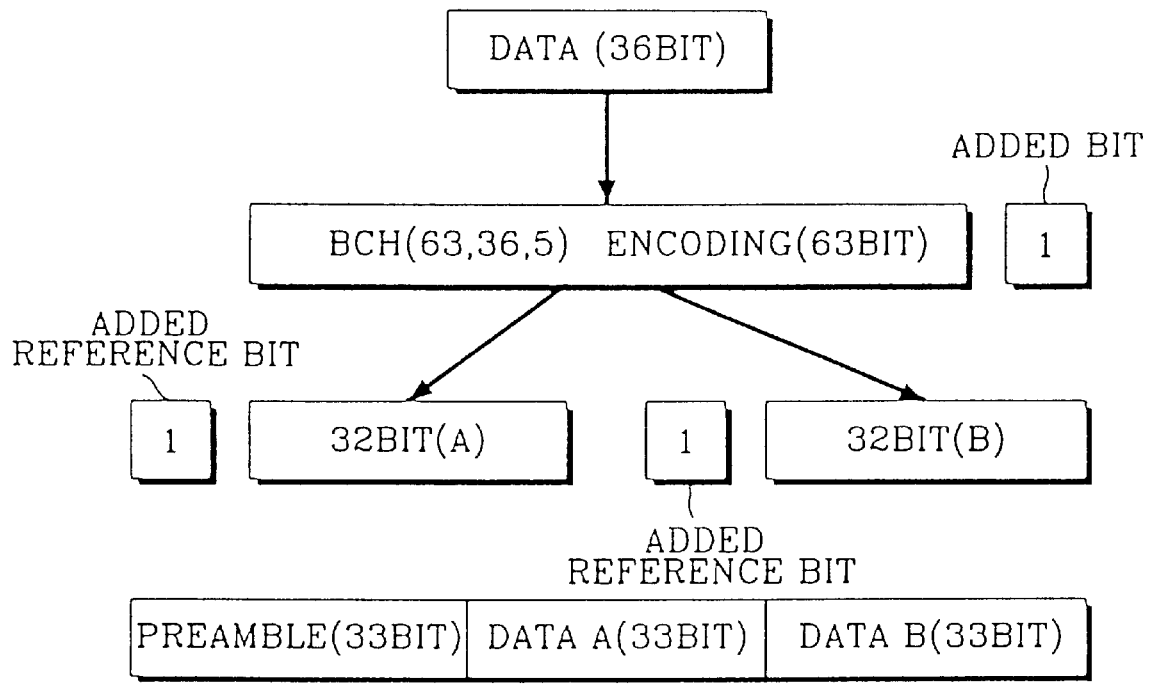
FIG. 2 is a block diagram illustrating the uplink code format of the radio pager according to the present invention.

Referring to FIG. 2, the uplink code encodes the data of 36 bits into BCH(63,36,5) code so as to be expanded to 63 bits, and one bit is added thereto to make 64 bits, which is then divided into data words A and B, each of 32 bits respectively. A reference bit (0) is added to the front of each 32 bit data word, in order to adopt the phase standard for DBPSK (Differential Binary Phase Shift Keying) modulation. The preamble has 33 bits which is an optional bit pattern irrelevant to BCH code. The above 36-bit data contains information on linked network type, inherent ID, message and index to be transmitted, and message type, etc., where 4 bits are allocated for setting the above message type, and the combinations of the above 4 bits can be used to be assigned for free destination information for the implementation of the present invention.

When repeating data ata transmission is repeated in order of AB, AB, . . . , after the preamble is repeatedly transmitted. For example, when using the other party's telephone number as destination information, in order to change the destination information into the above-mentioned data type for transmission, the original data A and B, each of 33 bits, and the above destination information data C and D, each of 33 bits, are transmitted. In this case, when repeating data transmission, the data transmission is repeated in order of ABCD, ABCD . . . , after the preamble is repeatedly transmitted.

Figure 3:
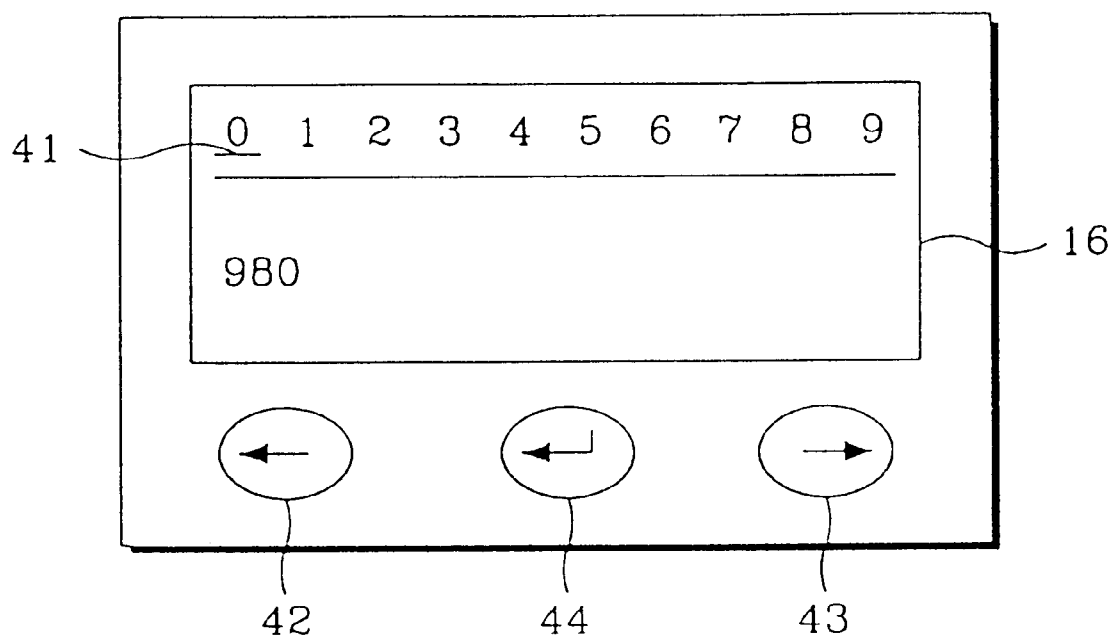
FIG. 3 is a schematic diagram of a display panel for illustrating selection of free destination operation according to the present invention.

Referring to FIG. 3, in the present embodiment, it is assumed that the other party's telephone number is the destination information. Accordingly, the numerals "0"~"9" are displayed on the screen, and a cursor 41 blinks under any one of the numerals, whereby the numerals are selected by moving the cursor 41. The key inputter 10 comprises direction keys 42, 43 for moving the cursor 41 in the right or left direction, and a return key for inputting the selected numerals.

Figure 4:
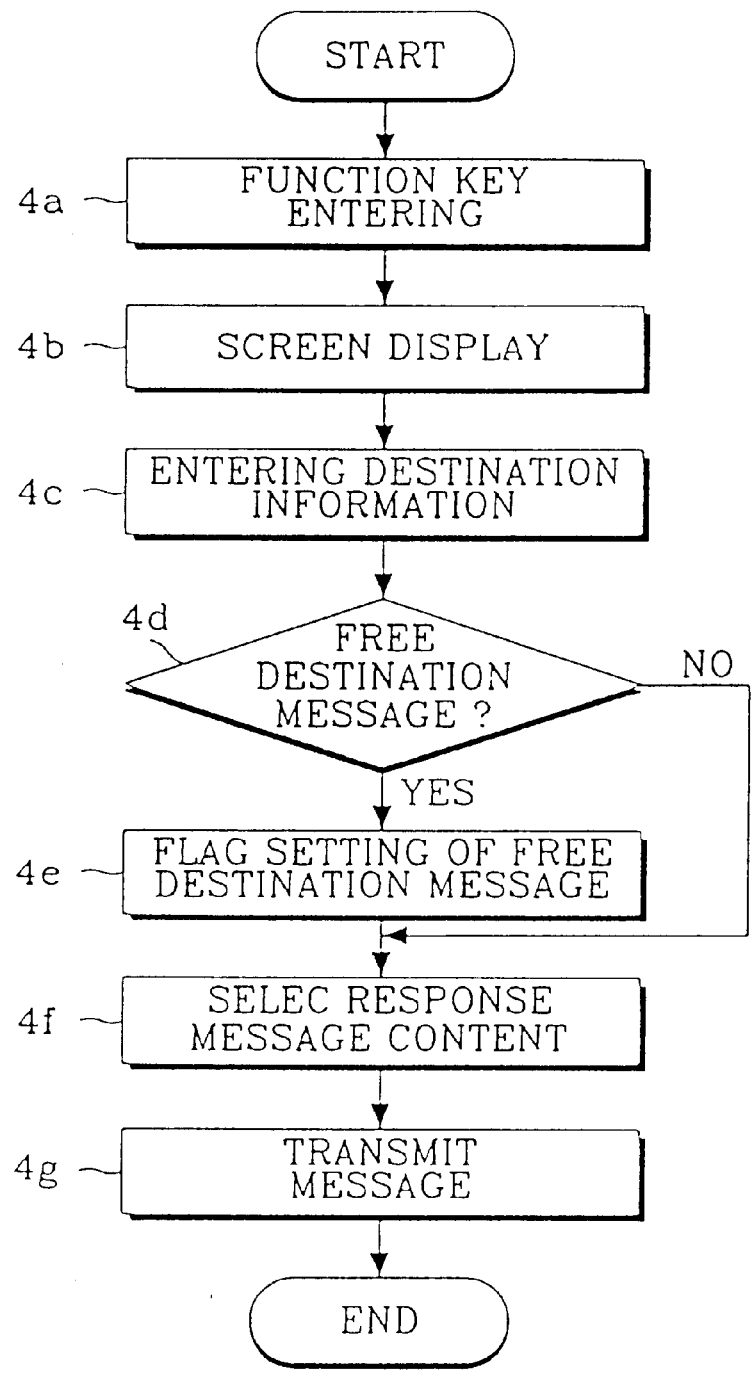
FIG. 4 is a flow chart illustrating the control of paging unlimited destination parties according to the present invention.

Referring to FIG. 4, when a user actuates the response message function key (key for setting the response message transmitting function), in Step 4a, the control unit 13 detects the above key actuation, and proceeds to Step 4b to retrieve the destination selecting screen information prestored in the memory 15 and displays such information on the display unit 16. In Step 4c, when the user selects a destination on the screen of the display unit 16 by means of the key inputter 10, the control unit 13 proceeds to Step 4d to access to the memory 15 for checking whether the selected destination exists, i.e, is registered in the corresponding information table (i.e., database). However, if the selected destination is not registered, the control unit 13 recognizes it as being free destination information (i.e., not previously registered destination). In this case, when entering free destination information not registered in advance, the user can additionally enter a specific key (e.g., '*') to inform the control unit 13 that the destination status of the information is free, so that the above checking operation may be skipped.

When a free destination status is selected, the control unit 13 proceeds to Step 4e to set the free destination flag, and then proceeds to Step 4f to select one of the preset various response messages. Thereafter in Step 4g, the control unit 13 transmits the message having the same format as shown in FIG. 2, which is a bit combination representing a message type, which includes the free destination information.

A central control system receives the above message through the base station equipment and analyzes the message type to detect the destination information, and calls the corresponding destination, thereby transmitting a response message. The above destination may be a conventional telephone apparatus, a facsimile machine, a telephone connected to a PC, or another bidirectional radio pager.

Figure 5:
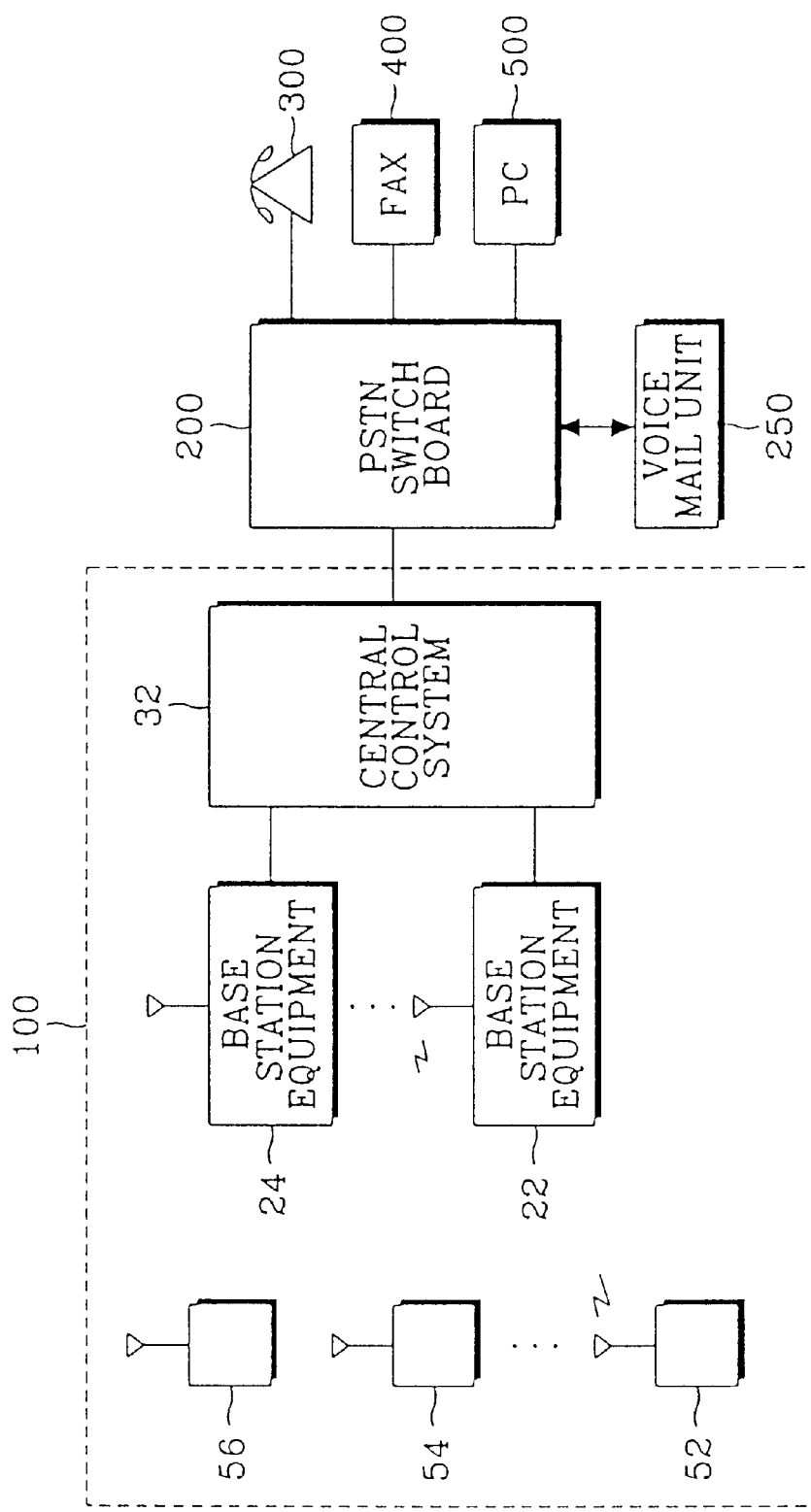
FIG. 5 is a block diagram illustrating an example of one embodiment of the present invention.

Referring to FIG. 5, the radio paging system 100 of the present invention comprises a plurality of radio paging devices, e.g., 52, 54, 56 carried by users, a plurality of base station equipment units, e.g., 22 and 24, and a central control system 32. While, for the sake of simplicity, only a few radio paging devices and base station equipment units are shown in FIG. 5, it is to be appreciated that more or less devices and units may be employed in the invention.

In the case where the radio paging system 100 is a bidirectional radio paging system, the above paging devices 52, 54, 56 each have a respective transmitter, and the above base station equipment units 22, 24 each have a respective reverse paging terminal capable of receiving signals transmitted by the above radio paging devices 52, 54, 56. Further, the above central control system 32 has a downlink/uplink control device. For the downlink operation, the POCSAG coding system, used worldwide at the present time, is preferably adopted. The POCSAG coding system is proposed expressly by the CCIR Recommendation No. 584. For the uplink operation, the aforementioned code format as shown in FIG. 2 is used. In the present embodiment, the device for controlling uplink operation is referred to as an "uplink control device".

For example, when the paging device 52 transmits paging messages in the operational area of the base station equipment 22, messages intended for the conventional telephone 300, the facsimile machine 400, and/or the personal computer 500 are received through the switchboard (PSTN) 200, and response messages intended for another paging device 56 are received through the corresponding base station equipment unit 22. When the base station equipment unit 22 transmits a response message to the telephone 300 under the control of the central control system 32, the above switchboard 200 calls the telephone 300 according to the received destination information (telephone number) and at the same time, the voice mail unit 250 provides corresponding voice information according to the response message index information received simultaneously. When transmitting messages to the facsimile machine 400, the PC 500, or to the other bidirectional radio pager 56, character messages are chiefly used.

As mentioned above, the present invention advantageously provides that the paged party can freely select and respond to the paging party without limiting the scope of the paging parties available for response, so that the efficiency of the bidirectional radio pager can be significantly improved in terms of utilization thereof, and the user can respond also to non-registered paging parties without taking additional measures for response.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A bidirectional radio paging system having at least one paging device and an uplink control device in which the at least one paging device and the uplink control device have a common database containing information on a plurality of paging destinations and about response messages of various contents, the at least one paging device comprising:

a first data generator that transforms destination information not previously registered in the database to a data format substantially in conformity with a data format associated with the uplink control device; and a second data generator that generates radio transmission data containing a free destination flag as a message type, data related to the formatted unregistered destination information provided by the first data generator, and an index indicating an optional message content selected from the database.

2. The paging device as defined in claim 1, further comprising a receiving unit for conditioning received signals.

3. The paging device as defined in claim 1, further comprising a decoder for converting a received signal to a data format and for detecting signal components contained in the received signal.

4. The paging device as defined in claim 1, further comprising a memory unit for storing data substantially pertaining to the paging operation.

5. The paging device as defined in claim 1, further comprising a transmission unit for transmitting data in accordance with destination and selected message information.

6. The paging device as defined in claim 1, further comprising a key inputter for inputting user paging information.

7. The paging device as defined in claim 1, further comprising a display unit for displaying various types of status and messages generated and received during paging operation.

8. The paging device as defined in claim 1, further comprising an alarm unit for generating an alarm signal when receiving messages during paging operation.

9. The system as claimed in claim 1, wherein the first and second data generator in the at least one paging device comprise at least one controller.

10. A destination non-limiting bidirectional radio paging system comprising:

a plurality of bidirectional radio pagers communicating with a database that stores a plurality of destinations and response messages with various contents, a first data generator that transforms destination information not previously registered in the database to a data format substantially in conformity with a data format associated with an uplink control device, each bidirectional radio pager also having a second data generator that generates radio transmission data containing a free destination flag as a message type, data related to the formatted unregistered destination information provided by the first data generator, and an index indicating an optional message content selected from the database; and an uplink control device that communicates with said database and configured to determine whether the free destination flag is to be inserted when receiving the radio transmission data provided by the second data generator and to read the unregistered destination information from the radio transmission data when detecting the free destination flag so as to transmit a message, conforming to the index, to the corresponding destination.

11. The radio paging system as defined in claim 10, further comprising a plurality of base station equipment units for transferring the radio transmission data transmitted from the plurality of bidirectional radio pagers to the uplink control device.

12. The system as claimed in claim 10, wherein the first and second data generators comprise at least one controller.

13. A method of performing bidirectional radio paging without limiting destinations of bidirectional radio pagers in a bidirectional radio paging system in which an uplink control device and the bidirectional radio pagers have a common database containing information on a plurality of paging destinations and about response messages of various contents, the method comprising the steps of:

(a) detecting destination information for responding to a paging party;

(b) checking whether the destination information is registered in the database;

(c) inserting a free destination flag into a transmission message format for uplink operation when the destination information is recognized as unregistered destination information;

(d) detecting a key entry for selecting one of the various content response messages; and (e) editing and transmitting a radio transmission message containing the free destination flag, the unregistered destination data, and a selected message content index in conformity with an uplink data format, when the insertion of the free destination flag and the content of said response message are determined.

\* \* \* \* \*